Patented Nov. 17, 1953

2,659,747

UNITED STATES PATENT OFFICE 2,659,747

MIXED ANHYDRIDES OF PHOSPHITE ESTERS AND PROCESSES OF PREPARING THE SAME

Richard W. Young, Stamford, Conn., assignor to American Cyanamid Company, New York, N. Y., a corporation of Maine No Drawing. Application December 1, 1950, Serial No. 198,722

13 Claims. (Cl. 260—461)

This invention relates to new organic compounds of phosphorus and methods of making the same. More particularly, the invention relates to certain new mixed anhydrides of phosphite esters.

An object of the invention is to make available a new class of organic compounds useful, for instance, as intermediates in the production of valuable solvents for paints, paint removers, paint brush cleaners, antioxidants, and reducing agents by, for example, a process comprising hydrolysis. The new class of compounds is also useful as intermediates in the preparation of amides by a process which comprises reacting a member of the new class of compounds of this invention with an amine having amine hydrogen as disclosed in my co-pending application, S. N. 198,721, now Patent No. 2,617,793, filed concurrently herewith. Another object of the invention is to provide suitable processes for the preparation of the new class of mixed anhydrides of phosphite esters. Other objects will appear hereinafter.

The new compounds of this invention, which are referred to in the specification and claims as mixed anhydrides of phosphite esters or mixed anhydrides of diesters of phosphorus acid and carboxylic acids, may be more specifically illustrated by the following structural formula:

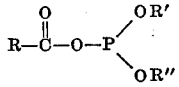

in which R is an organic radical and in which R' and R" are the same or different nonfunctional radicals.

By nonfunctional radical is meant a radical which does not enter into the reaction whereby the anhydride is made, react with the anhydride after it is made or appreciably affect the chemical properties of the anhydride. Examples of such radicals are: alkyl such as ethyl, propyl, butyl, octyl and the like; aromatic such as phenyl, napthyl, tolyl and the like; etc. It is believed that one skilled in the art of organic synthesis will have little difficulty selecting suitable radicals for R' and R".

R in the above formula may represent any organic radical capable of being attached to a carboxyl group. Examples of suitable radicals which may be represented by R are: aliphatic such as ethyl, methyl, propyl, butyl, butenyl and the like; substituted aliphatic such as benzyl, chloroethyl, carboxyethyl, aminoethyl, hydroxyethyl,

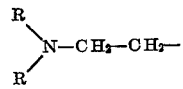

in which R is alkyl,

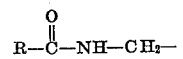

in which R is alkyl; aromatic such as phenyl, napthyl and the like; substituted aromatic such as chlorophenyl, nitrophenyl, tolyl and the like; heterocyclic such as piperidyl and the like. As will be more fully explained in the following paragraphs, the radical to be represented by R in the above formula depends upon the carboxylic acid employed in making the anhydride. Many suitable acids are set forth in subsequent paragraphs of this specification.

Generally speaking, the new compounds of this invention are oily liquids which freeze into non-crystalline glasses, and which decompose on attempted distillation. They are infinitely soluble in most of the common organic solvents, and form relatively stable solutions therein. The infra red absorption curve of the new compounds shows a pronounced characteristic absorption band at 1260 cm.$^{-1}$.

The new compounds of this invention may conveniently be prepared by reacting a carboxylic acid or salt thereof with a compound such as represented by the formula

where X is halogen and R' and R" are as defined above. These compounds are referred to in the specification and claims as halophosphites or as diesters of phosphorus halides. Because of the ease of preparation and reaction velocity the chlorophosphites are the preferred halophosphites.

The reaction is conveniently performed in an anhydrous, inert, organic solvent. Examples of suitable solvents are: benzene, toluene, or other aromatic hydrocarbons; chloroform or other halogenated aliphatics; normal octane or other aliphatic hydrocarbons; cyclohexane or other alicyclic hydrocarbon solvents; ethyl acetate or other of the lower aliphatic esters; ethyl ether or other lower aliphatic ethers; methyl butyl ketone or other lower aliphatic ketones; dioxane or other cyclic ethers, etc. Choice of solvent will depend primarily upon convenience, but as the new class of compounds are useful primarily as intermediates, in many instances they may be utilized without isolation from the solvent and in such instances the intended use will affect the choice of solvent.

As halide ions are released during the reaction it is usually advantageous to have present in the reaction mixture basic ions capable of forming insoluble salts with the halide ions. This can conveniently be done by employing as a reactant in the process, a carboxylic acid salt such as one formed with triethylamine or other tertiary amine. The salts of the carboxylic acids with metals such as silver, calcium, sodium, etc., are also satisfactory. Of course, if it is so desired, the halide ions may be neutralized after the reaction is complete as they in no way interfere with the reaction.

The reaction proceeds readily at room temperature or at any other convenient temperature up to the decomposition temperature of the reaction product. As a matter of convenience one is usually limited to a range between the freezing and reflux temperatures of the solvent employed. Temperatures between 0° C. and 30° C. are preferred.

The reaction proceeds immediately upon mixing the two reactants as is evidenced, when the anhydride is made from a salt such as described above, by precipitation of the amine hydrochloride, or of the metal chloride. Even at low temperatures, i. e., 0° C., the reaction is complete in a very few minutes.

The carboxylic acids suitable for the process of this invention are any of the available monocarboxylic or polycarboxylic acids. Suitable acids may be illustrated by the following: aliphatic carboxylic acids such as acetic, propionic, butyric, caprylic, oleic and the like; polybasic acids such as malonic, succinic, adipic, sebacic; substituted aliphatic acids such as monochloroacetic, R—CO—NH—CH$_2$—COOH where R is alkyl, and the like; aromatic such as benzoic, naphthalic and the like; heterocyclic acids such as nicotinic, thiophene carboxylic, and the like; alicyclic such as naphthenic; etc.

If the mixed anhydrides are prepared from carboxylic acids having more than one functioning group, i. e., groups having active hydrogen, sufficient halophosphite may, if desired, be employed to react with both the carboxy and the other functioning group; however, it is possible to use only one molecular equivalent of the halophosphite to form mixed anhydrides in which the radical represented by R in the general formula has other functioning groups. In preparing such anhydrides, it is usually advantageous to conduct the reaction at temperatures below about 30° C. to minimize side reactions. For instance, the monoanhydride of a dicarboxylic acid may be prepared in fair yield in this manner. Anhydrides in which the radical represented by R in the general formula does contain a functioning group decompose at somewhat lower temperatures than otherwise because of an interaction of the functioning group with the anhydride itself, and if the mixed anhydrides are to be used as intermediates, it is advisable to temporarily block the second functioning group of the carboxylic acid by acylation or substitution before making the anhydride.

The new compounds of this invention are of particular interest when made from the acylated naturally occurring aminoacids, for they are of great value in making optically active peptides and polypeptides according to the procedure of my co-pending application S. N. 198,721. Examples of such amino acids are: alanine, valine, norvaline, leucine, norleucine, isoleucine, isovaline, phenylalanine, tyrosine, serine, cysteine, methionine, aspartic acid, glutamic acid, lysine, ornithine, asparagine, citrulline, histidine, tryptophane, proline, hydroxyproline. Generally speaking, the naturally occurring aminoacids such as the above may be spoken of as alpha aminoacids having from two to twelve carbon atoms.

The invention will be more particularly illustrated by the following examples in which all parts are by weight unless otherwise specified.

*Example I*

One molecular equivalent of butyric acid is mixed with one molecular equivalent of triethylamine and to this is added one molecular equivalent of diethylchlorophosphite. Triethyl amine hydrochloride immediately precipitates.

The triethyl amine hydrochloride is removed by filtration leaving the mixed anhydride of the phosphite ester and butyric acid as an oily liquid: refractive index $n_D^{25}$ 1.424; density $d_4^{25}$ 1.065; molecular refractivity 49.3 as compared to a theoretical of 49.6.

*Example II*

Diethylchlorophosphite (15.6 g.) and 10.1 g. of triethylamine are dissolved in 50 cc. of chilled benzene and to this solution is added 6.01 g. of acetic acid. A quantitative yield of triethylamine hydrochloride is obtained by filtration. The solvent is evaporated in vacuo and the mixed anhydride of acetic acid and diethylphosphorous acid obtained as an oily liquid. In purified form, the anhydride has a decomposition temperature of approximately 70°C.; however, a 20% solution in toluene can be heated at 110° C. for an hour or more without undue decomposition.

*Example III*

In 10 cc. of benzene there is dissolved 0.299 g. of carbobenzoxyglycine and .10 g. of triethylamine. To this there is added .25 g. of diphenylchlorophosphite and the resulting precipitate of triethylamine hydrochloride removed by filtration. The benzene solvent is removed by evaporation in vacuo and the mixed anhydride obtained as a yellow oil which freezes to a non-crystalline glass at approximately 6° C. This compound is soluble in most organic solvents except petroleum ether.

*Example IV*

To 50 cc. of toluene there is added 2.72 g. of phthalylglycyl-DL-alanine and 1.20 g. of triethylamine. (Part of the acid fails to dissolve but this is not of major importance as the remainder will dissolve when the equilibrium is destroyed by part of the acid reacting to form the anhydride.) To this mixture is added 1.54 g. of diethylchlorophosphite, and the solution stirred for fifteen minutes. The solution is filtered to remove the triethylamine hydrochloride and a clear solution of the mixed anhydride is obtained.

The mixed anhydride solution from the above example was reacted according to the procedure of my aforementioned co-pending application S. N. 198,721 with DL-phenylalanine ethyl ester to obtain phthalylglycyl-DL-alanyl-DL-phenylalanine ethyl ester in an overall yield of 71%.

Example V

In 50 cc. of benzene there is dissolved 2.42 g. of benzoic acid and 2.0 g. of triethylamine. On the addition of 3.1 g. of diethylchlorophosphite, an immediate precipitate of triethylamine hydrochloride is obtained. After a few minutes the solution is filtered and the solvent evaporated in vacuo to obtain the mixed anhydride of benzoic acid as an oil. This compound shows infra red absorption bands at 1170, 1260, and 1320 cm.$^{-1}$.

Example VI

In 25 cc. of dioxane there is dissolved 1.46 g. of adipic acid and 2.02 g. of triethylamine. To this solution is added, with cooling, 3.02 g. of diethylchlorophosphite. The resulting solution is filtered to remove the precipitate of triethylamine hydrochloride, leaving a clear solution of the mixed dianhydride of adipic acid and diethylphosphorous acid.

The anhydride solution from the above example was reacted according to the procedure of my aforementioned co-pending application, S. N. 198,721 with 1.86 g. of aniline to obtain white crystals of adipic acid dianilide in an overall yield of 83%.

Example VII

Example VI is repeated using half the quantity of diethylchlorophosphite. The mono-anilide of adipic acid was obtained in an overall yield of 5%.

Example VIII

To 25 cc. of dioxane there is added 1.69 g. of carbobenzoxy-1-tryptophane and 0.5 g. of triethylamine. On the addition of 0.8 g. of diethylchlorophosphite a precipitate of triethylamine hydrochloride is obtained. After a few minutes the solution is filtered to remove the precipitate and the mixed anhydride obtained by careful evaporation of the solvent in vacuo.

Example IX

A cooled solution of 2.99 g. of carbobenzoxy-L-phenylalanine and 1.01 g. of triethylamine in 25 cc. of dioxane was treated with 1.56 g. of diethylchlorophosphite at room temperature. Removal of the precipitated triethylamine hydrochloride leaves a solution of the mixed anhydride. The mixed anhydride can be obtained as an oil by evaporation of the solvent in vacuo or the solution of the mixed anhydride can be employed as such for further reaction.

The procedure for making mixed anhydrides of other carboxylic acids is the same as shown in the above examples.

I claim:

1. A mixed anhydride of a diester of phosphorous acid and a carboxylic acid represented by the formula:

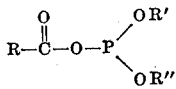

in which

represents an acyl group and in which R' and R" represent nonfunctional esterifying radicals.

2. A mixed anhydride of phosphorous acid diethyl ester and acetic acid.

3. A mixed dianhydride of adipic acid and phosphorous acid diethyl ester.

4. A mixed anhydride of a diester of phosphorous acid and an α-acidamidocarboxylic acid represented by the formula:

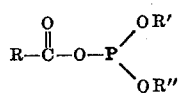

in which

represents an acyl group derived from said α-acidamidocarboxylic acid and R' and R" represent hydrocarbon esterifying radicals.

5. A mixed anhydride of phosphorus acid diphenyl ester and carbobenzoxyglycine.

6. A mixed anhydride of a diester of phosphorous acid and α-acidamidopropionic acid represented by the formula:

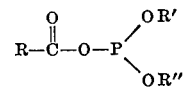

in which R' and R" represent hydrocarbon esterifying radicals and

represents an acyl group derived from said α-acidamidopropionic acid.

7. A mixed anhydride of phosphorous acid diethyl ester and phthalylglycylalanine.

8. A mixed anhydride of a diester of phosphorous acid and α-acidamido-β-phenylpropionic acid represented by the formula:

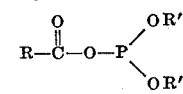

in which R' and R" represent hydrocarbon esterifying radicals and

represents an acyl group derived from said α-acidamido-β-phenylpropionic acid.

9. A mixed anhydride of phosphorous acid diethyl ester and carbobenzoxyphenylalanine.

10. A process of preparing mixed anhydrides of diesters of phosphorous acid and carboxylic acids represented by the formula:

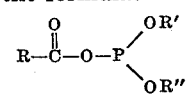

in which

represents an acyl group and in which R' and R" represent nonfunctional esterifying radicals, which comprises contacting a compound selected from the group consisting of carboxylic acids and salts thereof, with a diester of phosphorous acid halide represented by the formula:

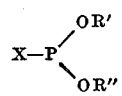

in which X represents halogen and R' and R" are as defined above.

11. The process of claim 12 when the diester of phosphorous acid halide is diethylchlorophosphite.

12. The process of claim 12 when the carboxylic acid is an α-acidamidocarboxylic acid.

13. A process of preparing mixed anhydrides of diesters of phosphorous acid and carboxylic acids represented by the formula:

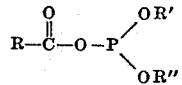

in which R' and R" represent hydrocarbon esterifying groups and

represents an acyl group derived from an α-acidamidocarboxylic acid, which comprises contacting in an inert organic solvent, a diester of phosphorous acid chloride represented by the formula:

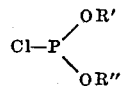

in which R' and R" are as defined above, with a tertiary amine salt of an α-acidamidocarboxylic acid.

RICHARD W. YOUNG.

References Cited in the file of this patent

Brooks, J. Am. Chem. Soc., vol. 34, pages 492–9 (1912).

Hurd, J. Am. Chem. Soc., vol. 54, page 3427 (1932).

Lynen, Ber. Deut. Chem., vol. 73, page 368 (1940). (Complete article, pages 367–375).